United States Patent [19]

Nakasuji et al.

[11] Patent Number: 5,733,667
[45] Date of Patent: Mar. 31, 1998

[54] PLATED NICKEL-TITANIUM ALLOY PRODUCT

[75] Inventors: Kazuyuki Nakasuji, Nishinomiya; Mitsuru Aiba, Fujisawa; Masaki Takashima, Urawa, all of Japan

[73] Assignees: Sumitomo Metal Industries, Ltd., Osaka; Kanto Special Steel Works, Ltd., Fujisawa; Sanyo Special Alloys, Ltd., Tochigi-ken, all of Japan

[21] Appl. No.: 502,320

[22] Filed: Jul. 13, 1995

[51] Int. Cl.$^6$ .............................. B32B 15/02; C22F 1/10; C22F 1/18

[52] U.S. Cl. .............. 428/607; 428/660; 428/680; 428/935; 148/518

[58] Field of Search .............................. 428/607, 660, 428/680, 672, 935; 148/518

[56] References Cited

U.S. PATENT DOCUMENTS

| | | | |
|---|---|---|---|
| 4,331,258 | 5/1982 | Geschwind | 220/359 |
| 4,472,035 | 9/1984 | Takamura et al. | 351/41 |
| 4,772,112 | 9/1988 | Zider et al. | 351/41 |
| 4,896,955 | 1/1990 | Zider et al. | 351/41 |
| 5,069,226 | 12/1991 | Yamauchi et al. | 128/772 |
| 5,368,661 | 11/1994 | Nakamura et al. | 148/512 |
| 5,452,028 | 9/1995 | Iijima | 351/124 |
| 5,490,859 | 2/1996 | Mische et al. | 606/159 |

FOREIGN PATENT DOCUMENTS

| | | |
|---|---|---|
| 56-89716 | 7/1981 | Japan . |
| 63-186891 | 8/1988 | Japan . |
| 2-500050 | 1/1990 | Japan . |
| 2-97696 | 4/1990 | Japan . |

OTHER PUBLICATIONS

Derwent Publication AN 90-152510, no date.
Derwent Publication AN 88-254878, no date.

*Primary Examiner*—John J. Zimmerman
*Attorney, Agent, or Firm*—Armstrong, Westerman Hattori, McLeland & Naughton

[57] ABSTRACT

A plated nickel-titanium alloy product having a plated layer of nickel or a nickel alloy containing 5 to 15% by weight of cobalt. This product exhibits excellent surface treatability and workability, as well as shape memory effect and superelasticity. Thus the product is most suitable for eyeglass frame components or similar ornamental articles.

The product is produced by plating a layer of nickel or a nickel-cobalt alloy on the nickel-titanium alloy, dehydrogenating, cold working with not less than 10% working ratio, and subjecting to a final heat treatment between 300° C. and 900° C. If the final heat treatment is conducted between 750° C. and 900° C. for 10 to 120 seconds, a product with 4% or more super-elasticity at room temperature can be obtained.

4 Claims, 6 Drawing Sheets

PLATED NICKEL-TITANIUM ALLOY PRODUCT

FIELD OF THE INVENTION

This invention relates to a metal plated nickel-titanium alloy product and more particularly to a nickel-titanium alloy wire which is plated with a nickel or nickel alloy layer. This alloy product exhibits excellent shape memory effect, super-elastic properties, fatigue resistance and workability, and is suitable for making, for example, eyeglass frame components such as bridges, temples, rims and endpieces.

BACKGROUND OF THE INVENTION

Wire of a shape memory alloy, especially of a nickel-titanium alloy mainly composed of nickel and titanium, is increasingly being used for eyeglass frame components due to its excellent workability, shape memory properties, super-elastic properties and fatigue resistance (refer to Japanese International Patent Public Disclosure No.2-500050, corresponding to U.S. Pat. No. 4,772,112 and No. 4,896,955).

Although the usual practice is to use a shape memory alloy as it is, i.e. without subjecting it to any surface treatments such as metal plating, in the case of eyeglass frame components, it has become common recently to surface treat them e.g., by plating with a precious metal such as gold to give them a high grade and refined appearance.

A clad type wire composed of a shape memory alloy core and an outer coating layer of any different metal e.g., a precious metal, has been proposed in Japanese Patent Public Disclosure No. 56-89716 and U.S. Pat. No. 4,472,035. However, such a clad type wire is more expensive than a plated wire, because many complicated and costly steps are required to form the multilayered structure of the clad wire.

Since a shape memory alloy is mainly composed of nickel and titanium, it contains more than 50 ppm detrimental hydrogen, after it is worked into eyeglass components and surface-treated by electrolytic polishing and plating. The resultant eyeglass components can only have poor fatigue resistance which means the eyeglass components are prone to rupture if subjected to slight stress even for a few times. In order to avoid a lessening of the fatigue resistance of such eyeglass components, it is usually necessary to subjected them to a thermal dehydrogenating treatment. This treatment, however, may damage various physical properties of the shape memory alloy.

Due to the above problems, in spite of the fact that there is a strong demand for it, a low-cost shape memory alloy wire having excellent shape memory effect, super-elastic properties, fatigue resistance, surface treatability and workability, and thus suitable particularly for making eyeglass components with a high grade appearance, has not been developed yet.

SUMMARY OF THE INVENTION

One object of this invention is to provide a product, particularly a wire for making eyeglass frame components excellent in fatigue resistance, surface treatability, workability, shape memory effect and super-elasticity, and capable of being used for eyeglass components with a high grade and refined appearance.

Another object of this invention is to provide a process for economically producing the above-mentioned nickel-titanium alloy product.

Nickel-titanium alloy tends to absorb hydrogen during surface treatment, and fatigue resistance of the alloy is severely lowered due to hydrogen embrittlement. If a nickel-titanium alloy with a high hydrogen content is used for eyeglass components, they may break very easily. On the other hand, if the alloy is subjected to dehydrogenating heat treatment, the alloy will lose its desirable physical properties of a shape memory alloy.

In order to develop a nickel-titanium alloy that retains its desirable physical properties even after dehydrogenation, the inventors have conducted various studies with a view to using a nickel-titanium alloy wire for eyeglass components, and have found that, if the nickel-titanium alloy wire is first plated with a nickel or nickel alloy layer and properly heat-treated, the resultant wire exhibits excellent surface condition for a following gold or precious metal plating treatment as well as excellent workability for press forming or similar plastic working without losing any desirable physical properties as a shape memory alloy.

This invention has been accomplished on the basis of these studies and relates to:

1. A nickel-titanium alloy product, a nickel-titanium alloy wire, having a plated layer of nickel or a plated layer of nickel alloy containing 5–15% by weight of cobalt.
2. A nickel-titanium alloy wire for eyeglass frame components having a plated layer of nickel or a plated layer of nickel alloy containing 5–15% by weight of cobalt.

The nickel-titanium alloy of the above-mentioned product 1 or wire 2 is preferably an alloy comprised of from 50.5 to 51.5 atomic % nickel and the remainder substantially titanium, or an alloy comprised of nickel and titanium in the atomic % ratio of from 1:0.90 to 1:1.10, and not more than 3% by weight of one or more of the following elements; iron, cobalt, chromium, vanadium.

The above-mentioned wire should be manufactured in the process including steps of (a) plating, (b) dehydrogenating, (c) cold-working and (d) a final heat-treating.

More specifically, the wire of this invention is manufactured in the process including the aforementioned steps (a)–(d):

(a) plating a layer of nickel or a nickel alloy containing 5 to 15% by weight cobalt on a nickel-titanium alloy product,
(b) heat treating the product in a temperature range from 350° C. to 750° C.,
(c) cold-working the product with not less than 10% working ratio, and
(d) subjecting the cold-worked product to a final heat treatment in a temperature range from 300° C. to 900° C.

The final heat treatment (Step d) in the above-mentioned process is preferably conducted in a temperature range from 750° C. to 900° C. for 10 to 120 seconds, thereby imparting to the resultant product not less than 4% super-elasticity at room temperature.

DETAILED DESCRIPTION OF THE INVENTION

The nickel-titanium alloy product of this invention includes intermediate products, such as a nickel-titanium alloy wire, and eyeglass frame components made of the wire, the surface of which is plated with nickel or a nickel alloy. The nickel-titanium alloy may be either (a) a binary alloy consisting of 50.5 to 51.5 atomic % nickel and the remainder substantially titanium, or (b) an alloy consisting of nickel, titanium, the ratio of nickel (atomic %) to titanium (atomic %) being from 1.0:0.90 to 1.0:1.10, and not more than 3% of one or more of the following elements; iron, cobalt, chromium, vanadium. Either of the above alloys exhibits super-elastic properties at temperatures below room temperature, thus making it suitable as a material for use as eyeglass frame components.

The preliminary plating layer to be applied to the nickel-titanium alloy product should be pure nickel or a nickel alloy containing 5 to 15% cobalt, either of which layer is the most preferable undercoating layer for the final precious metal plating which will be applied thereon.

A plated layer that is too thick tends to crack due to internal stress, so the thickness of the plated layer is preferably kept below 50 μm. Furthermore, the thickness of the plated layer is preferably in a range from 1/50 to 1/150 by outer diameter ratio (=thickness of the plated layer/the outer diameter of the plated nickel-titanium alloy wire).

The nickel plating (Step 3 in FIG. 1) can be conducted using, e.g., an electrolytic solution containing 450 g/l nickel sulfamate, 5 g/l nickel chloride and 35 g/l boric acid with a cathode current density of 3 to 30 A/dm², at bath temperatures of 40° to 50° C. with a pH value of about 4, for from some ten minutes to several tens of minutes.

The plating of a nickel alloy containing cobalt is carried out under the same conditions as in the plating of nickel except that cobalt sulfamate is added to the above-said electrolytic solution so as to produce the desired ratio of cobalt ions to nickel ions in the electrolytic solution.

The first heat treatment (Step 4 in FIG. 1), carried out after a series of working and plating treatments, is a dehydrogenating treatment to remove the hydrogen absorbed in the plated layer and in the nickel-titanium alloy.

Close inspection of the plated nickel-titanium alloy product revealed that most of the hydrogen was absorbed during preliminary surface activating treatment (electrolytic polishing or pickling treatment, Step 2 in FIG. 1) for the nickel-titanium alloy surface prior to the plating treatment.

Figure 1:
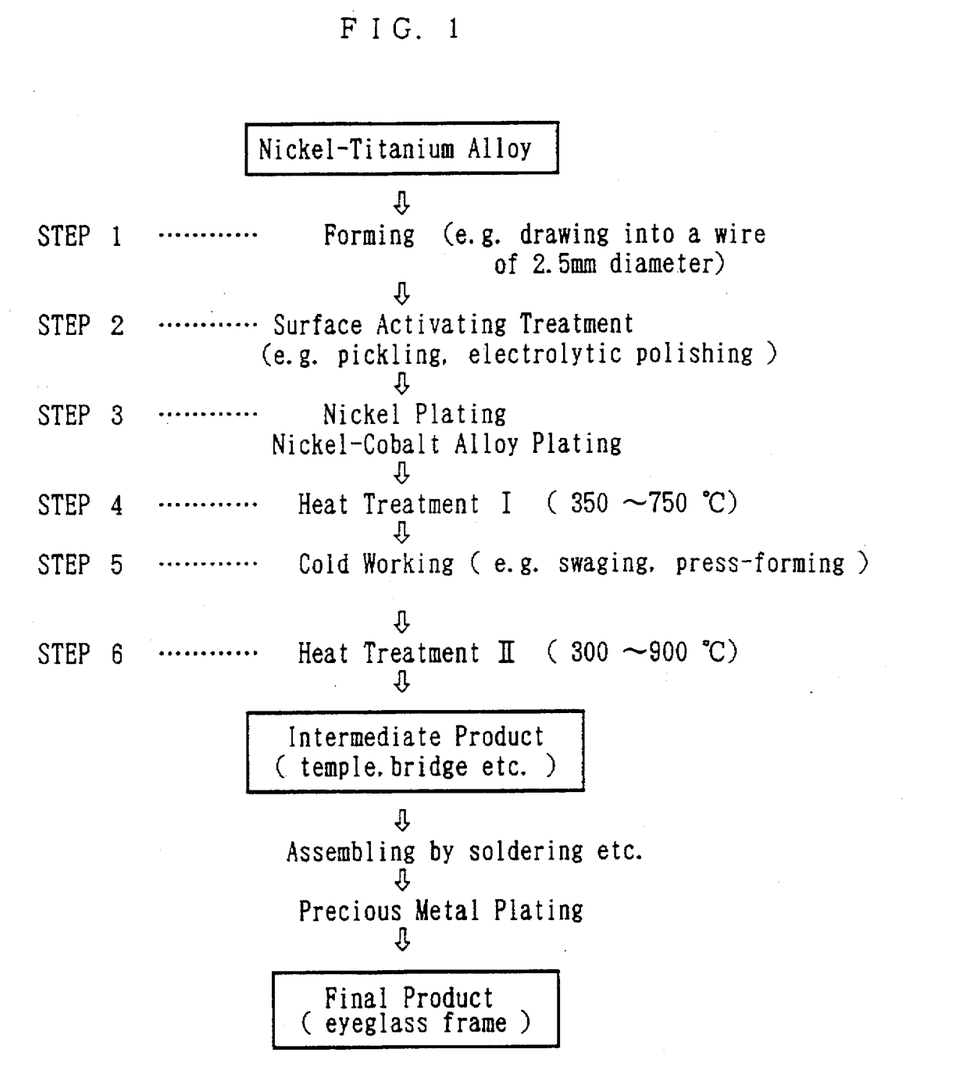
FIG. 1 is a process chart for producing eyeglass frame components according to this invention.

In FIG. 1, step 2 is an activating step for the surface of the article to be plated, and steps 3 to 6 are characteristic portions of the process of this invention. Through these steps 1 to 6, intermediate products such as wire and eyeglass frame components are made. These intermediate products are designated as "nickel-titanium alloy products" or simply "products" in this specification. The products are plated with a precious metal layer, and then assembled by soldering etc. into the final product, e.g. eyeglass frames.

Figure 2:
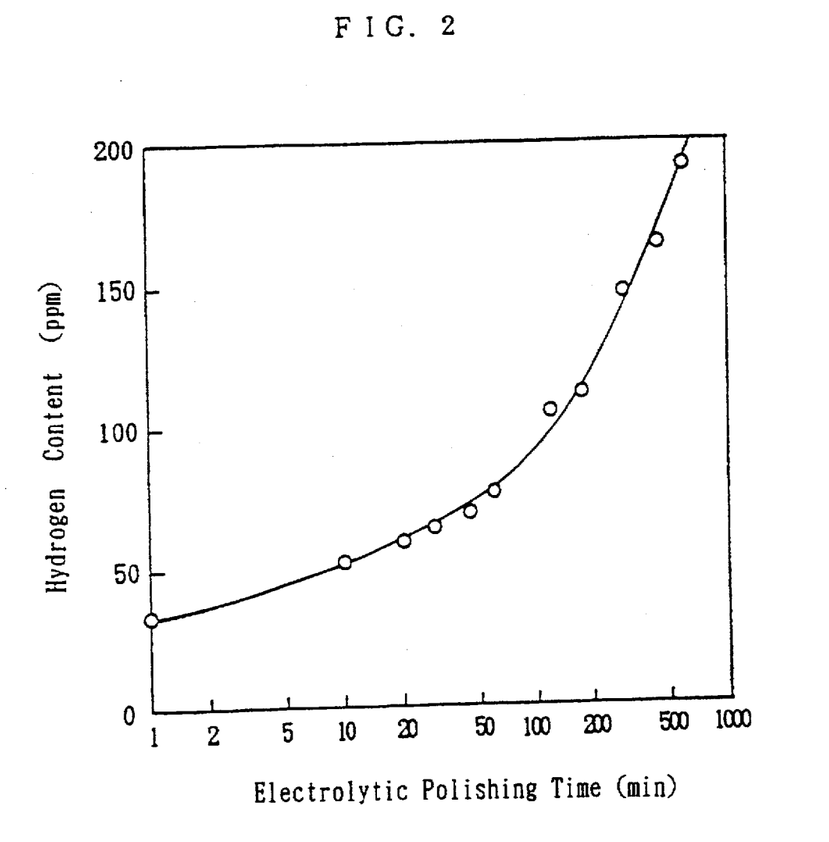
FIG. 2 is a graph showing the relationship between electrolytic polishing time and hydrogen content of a nickel-titanium alloy.

FIG. 2 is a graph showing the relationship between duration of electrolytic polishing, a kind of surface activating treatment, and the hydrogen content(ppm) of a nickel-titanium alloy wire. A nickel-titanium alloy wire (2.5 mm diameter) is electrolytically polished in a dilute nitrofluoric acid aqueous solution with an applied potential of 4 volts, in which as the electrolytic polishing time increases, the hydrogen content increases.

Figure 3:
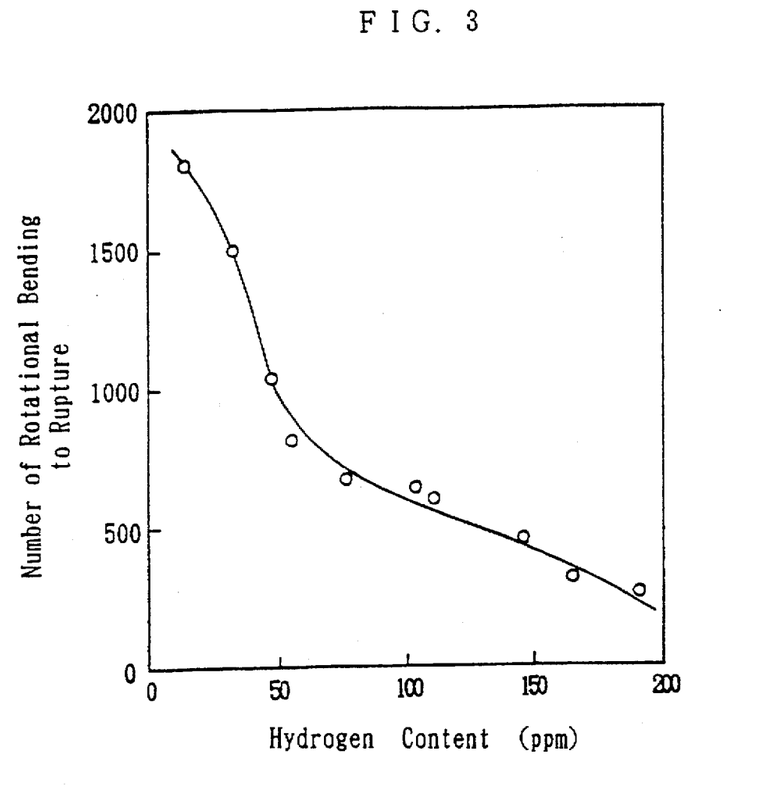
FIG. 3 is a graph showing the relationship between hydrogen content of an electrolytically polished nickel-titanium alloy wire and number of rotational bendings at which a fatigue rupture occurs.

FIG. 3 is a graph showing the influence of hydrogen content of the electrolytically polished wire on fatigue rupture as measured by rotational bending test. It is apparent from the graph that the fatigue characteristics of the nickel-titanium alloy wire is greatly impaired by the hydrogen content; thus, lowering the hydrogen content is necessary for improving the fatigue characteristics of the wire.

To remove the hydrogen absorbed in the alloy, a heat treatment, i.e., dehydrogenating treatment, is carried out at a temperature range of 350° to 750° C. (Step 4 in FIG. 1). If the dehydrogenating temperature is lower than 350° C., the hydrogen is not sufficiently removed. On the other hand, if the dehydrogenating temperature exceeds 750° C., a nickel plated layer or a nickel alloy plated layer becomes brittle and tends to peel off when the plated product is subsequently subjected to the cold working step. The dehydrogenating treatment is useful for softening the product as well.

The above-mentioned dehydrogenating heat treatment is different from the heat treatment to impart super-elastic properties to the alloy, which usually is performed by heating the nickel-titanium alloy at temperatures from 300° to 500° C. for 30 to 120 min. Therefore, the alloy immediately after dehydrogenating heat treatment does not have the shape memory effect and super elastic properties of a shape memory alloy.

In order to release the thermal hysteresis of the nickel-titanium alloy caused by the dehydrogenating heat treatment, and thus restore the desirable properties of shape memory alloy, the alloy must be subjected to a cold working and subsequent heat treatment (Step 5 and Step 6 in FIG. 1). The cold working gives a working stress not only on the nickel-titanium alloy wire but also on the nickel or nickel alloy plated layer formed on the nickel-titanium alloy wire surface, whereby the outer plated layer is applied with a forging force and thereby compacted and well adhered to the surface of the nickel-titanium alloy wire. Thus, the adhesive strength on an interface between the plated layer and the wire surface is much increased and surface properties of the plated layer are also improved.

The working ratio of the cold working should not be less than 10%, in order to impart necessary properties of the shape memory alloy and to increase the adhesive strength of the plated layer. The cold working includes steps such as wire drawing through dies, swaging, press forming, etc.

After cold working, the plated wire is subjected to another heat treatment, i.e., the final heat treatment (Step 6 in FIG. 1) which is necessary to fully impart shape memory effect and super-elasticity, both being defining qualities of the shape memory alloy. More particularly, the crystal grains destroyed by dislocations due to the cold working are heated, thus again arranged in regular order, which is necessary to exhibit the desired physical properties.

The final heat treatment is conducted at a temperature range of from 300° to 900° C. The heat treatment may be conducted either in a manner similar to the usual stress relief heat treatment carried out at a temperature range of 300° to 500° C. for 30 to 120 min., or may be conducted at a higher temperature range of 500° to 900° C. for 30 min. or less.

If the temperature at the final heat treatment is in a range of from 750° to 900° C., only 10 to 120 seconds short period heating easily produces a nickel-titanium alloy having a super-elasticity of not less than 4% at room temperature. Such an alloy is most suitable for producing various components of eyeglass frames. If the final heat treating temperature is lower than 750° C., short periods of time as 10 to 120 seconds is not sufficient to produce desired super-elasticity of not less than 4% at room temperature.

On the other hand, if the final heat treating temperature exceeds 900° C., the alloy is fully annealed and strain caused by the cold-working will be released. Such a fully annealed alloy has poor super-elastic properties.

EXAMPLE

A nickel-titanium alloy composed of 50.5 atomic % nickel, 1.5 atomic % cobalt and the balance titanium was melted in a vacuum arc furnace and cast into an ingot, which then was hot forged, hot rolled and cold rolled into a round wire having a diameter of 6.0 mm. Then, the wire was cold draw through dies with an area reduction ratio of about 40% followed by an intermediate annealing treatment. The cold drawing and annealing cycle was repeated several times to obtain a wire having a diameter of 2.5 mm.

Samples taken from the wire were immersed in one of two type electrolytic solutions; the first was composed of nickel sulfamate, nickel chloride and boric acid for plating the nickel layer, and the second had the same composition as the first except for an additional cobalt sulfamate for plating the nickel-10% cobalt layer. Plating in each solution was carried out with a current density of 10 to 12 A/md$^2$ for 5 min. to form samples with a plated layer thickness of 25 µm. The plated layer thickness was about 1/100 by the above-mentioned outer diameter ratio.

An influence of heat treating temperature on hydrogen content of the above plated nickel-titanium alloy wire samples was investigated. The heat treating time was fixed at 15 min. The results of the investigation on the nickel plated nickel-titanium alloy wire are shown in FIG. 4.

Figure 4:
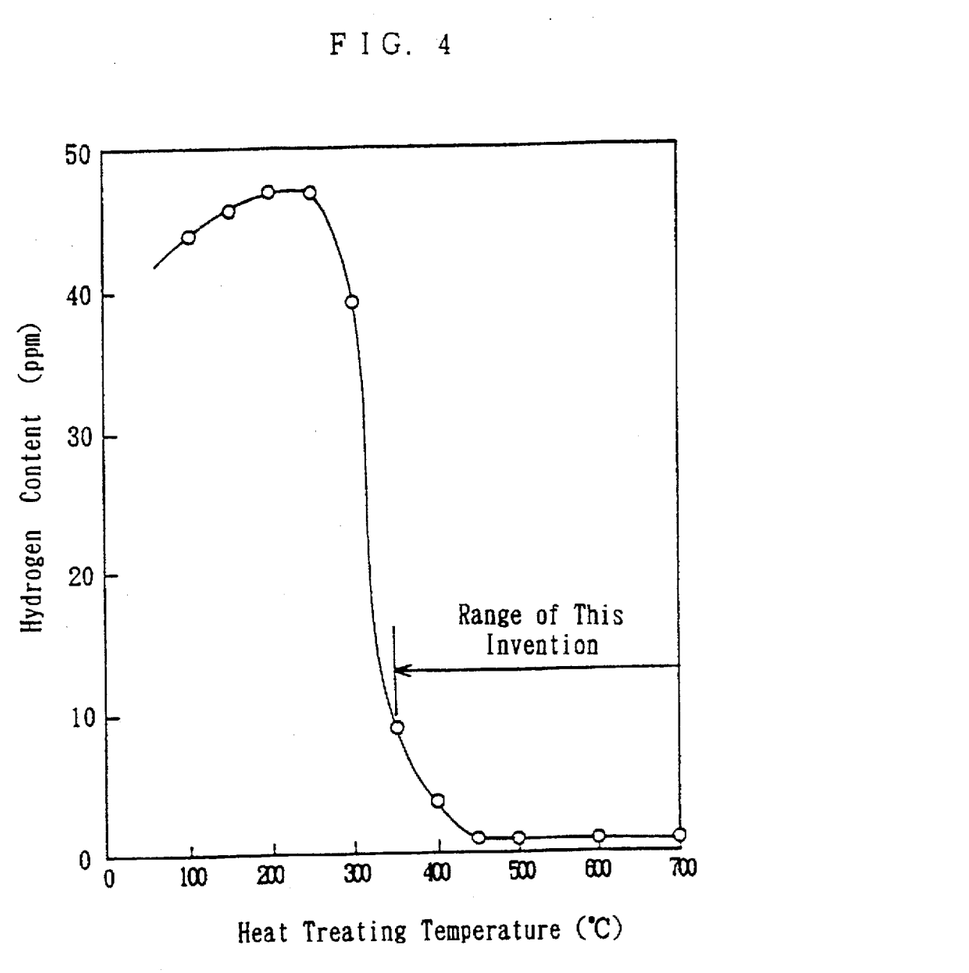
FIG. 4 is a graph showing the relationship between hydrogen content of a nickel plated nickel-titanium alloy wire and heat treating temperature.

In FIG. 4, the temperature range above 350° C. is in conformity with a restriction of this invention and reduces the hydrogen content to below 10 ppm, a very low level. Almost the same results were obtained when the heat treating time was fixed at 30 min. Although the time required for a satisfactory heat treatment depends on the wire diameter, the test results demonstrated that for the 2.5 mm diameter wire the preferable heat treating time is 15 min. or longer.

Similar results were obtained on the test for a nickel-cobalt alloy plated nickel-titanium alloy wire samples.

The nickel plated nickel-titanium alloy wire sample, which was heat treated at 500° C. according to the test shown in FIG. 4, was cold drawn through dies into a and then heat treated at a temperature of 500° C. The influence of cold working on the adhesive strength of the plated layer on the nickel-titanium alloy wire surface was then investigated.

Figure 5:
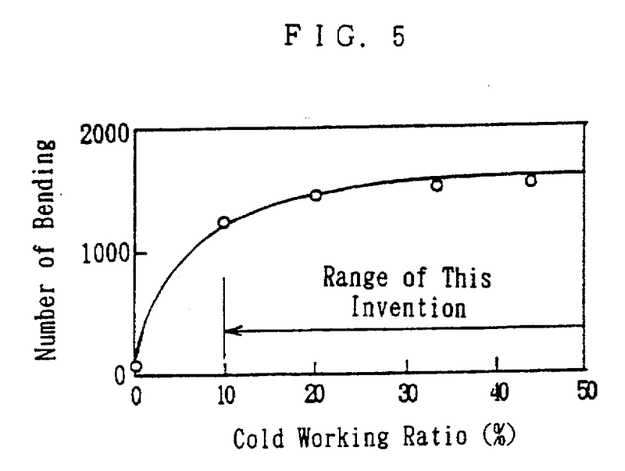
FIG. 5 is a graph showing the relationship between adhesive strength of the plated layer (as measured by the number of bendings at which a nickel plated layer on a nickel-titanium alloy is broken) and the cold working ratio applied to the plated nickel-titanium alloy wire.

The test results, which are derived from the alternating bend test with 60° bending angle, are shown in FIG. 5. Evaluation of the adhesive strength of the plated layer was conducted by determining the number of bendings at which cracks formed on the plated layer.

The test results in FIG. 5 show that if the ratio of reduction of area due to drawing, i.e., cold working ratio, becomes 10% or more, the minimum bending number at which cracks form on the plated layer greatly increases. In addition, microscopic inspection revealed that the microstructure of the plated layer was improved, that is, changed into a desired deformed structure when a cold working ratio of 10% or more was selected.

While FIG. 5 shows test results for a nickel-titanium alloy wire plated with a nickel layer, equally favorable results were obtained for a nickel-titanium alloy wire plated with a layer of a nickel-cobalt alloy which contains about 10% cobalt.

After cold drawing the nickel-titanium alloy wire plated with nickel or nickel alloy containing 10% cobalt through dies with a drawing ratio of 30%, wire samples were subjected to either a heat treatment at 400° C. to impart super-elasticity, or another heat treatment at 850° C. to soften. After these heat treatment, each wire sample showed sufficient super-elasticity and shape memory effect without fail.

Next, a nickel-titanium alloy wire plated with pure nickel and successively heat treated at 550° C. was press-formed with a cold working ratio of 30% to form a temple, which was further heat treated under various conditions as shown in Table 1. The super-elastic properties of the resultant temple at room temperature was measured, and applicability to the actual temple was evaluated on the basis of whether or not the temple specimen exhibited super-elasticity of 4% or more. More specifically, the super-elastic properties of the temple specimen were evaluated by measuring their residual strain after applying a stress to cause 4% elongation and then relieving the stress. A temple specimen retaining not more than 0.2% residual strain were considered as having favorable super-elastic properties.

Figure 6:
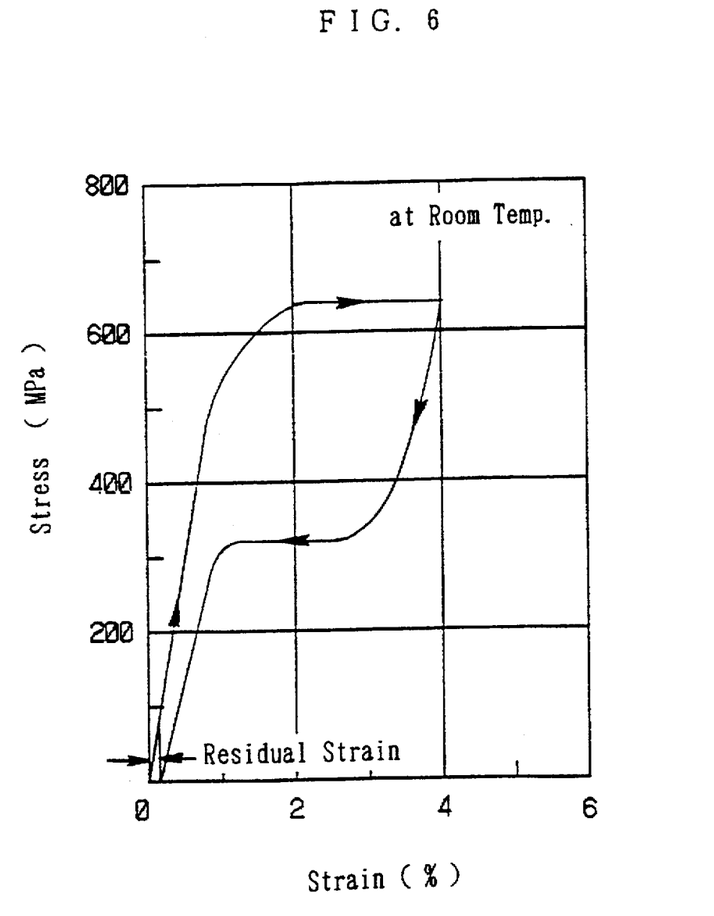
FIG. 6 is a stress-strain curve of the product of this invention showing a typical super-elasticity phenomenon.

FIG. 6 is a typical stress-strain curve showing super-elastic properties of the product of this invention at room temperature. When strain becomes more than 1%, stress-induced transformation from austenite to martensite occurs and a plateau appears. If stress is removed after the plateau continues for a while, the reverse transformation from martensite to austenite occurs. Thus the curve shows the typical super-elastic properties.

The super-elastic properties of the product of this invention as shown in FIG. 6 is considerably different from the properties shown in FIG. 2H of said U.S. Pat. No. 4,772,112 wherein the characteristics of the reverse transformation cannot be distinguished clearly.

The test results are also shown in Table 1, wherein the symbol "o" represents that the corresponding temple specimen exhibits a residual strain of not more than 0.2%, i.e., a specimen with acceptable super-elastic properties, and the symbol "×" represents that the temple specimen exhibits a residual strain exceeding 0.2%. Specimens labeled as "Examples" are examples of this invention which exhibit super-elasticity of 4% or more at a room temperature. These specimens are most suitable for eyeglass frame components. Specimens labeled as "Comparative Examples" do not exhibit the super-elasticity of 4% or more at room temperature.

TABLE 1

|  | No. | Heat Treating Conditions Temp. (°C.) | Time (sec) | Evaluation of Super-elasticity |
|---|---|---|---|---|
| Comparative | 1 | *700 | 10 | X |
|  | 2 | *700 | 30 | X |
|  | 3 | *700 | 60 | X |
|  | 4 | *700 | 120 | X |

TABLE 1-continued

| | No. | Heat Treating Conditions | | Evaluation of Super-elasticity |
|---|---|---|---|---|
| | | Temp. (°C.) | Time (sec) | |
| | 5 | *700 | 300 | ○ |
| Example | 6 | 750 | 10 | ○ |
| | 7 | 750 | 30 | ○ |
| | 8 | 750 | 60 | ○ |
| | 9 | 750 | 120 | ○ |
| Comparative | 10 | 750 | *300 | X |
| Example | 11 | 800 | 10 | ○ |
| | 12 | 800 | 30 | ○ |
| | 13 | 800 | 60 | ○ |
| | 14 | 800 | 120 | ○ |
| Comparative | 15 | 800 | *300 | X |
| Example | 16 | 850 | 10 | ○ |
| | 17 | 850 | 30 | ○ |
| | 18 | 850 | 60 | ○ |
| | 19 | 850 | 120 | ○ |
| Comparative | 20 | 850 | *300 | X |
| Example | 21 | 900 | 10 | ○ |
| | 22 | 900 | 30 | ○ |
| | 23 | 900 | 60 | ○ |
| | 24 | 900 | 120 | ○ |
| Comparative | 25 | 900 | *300 | X |
| | 26 | *950 | 10 | X |
| | 27 | *950 | 30 | X |
| | 28 | *950 | 60 | X |
| | 29 | *950 | 120 | X |
| | 30 | *950 | 300 | X |

Note; *Outside of the Scope of This Invention.

It is apparent from Table 1 that not enough super-elastic properties are obtained when the heat treating temperature was lower than 750° C. (Comparative Examples 1 to 5) or was higher than 900° C. (Comparative Examples 26 to 30 or when heat treating time exceeded 120 sec. even if the heat treating temperature fell within the scope of this invention (Comparative Examples 10,15,20 and 25). If heat treating time is shorter than 120 sec. while heating temperature is kept at 700° C., the desired degree of heat treating effect cannot be obtained. On the other hand, if the heat treating temperature is kept at 950° C. while heat treating time exceeds 10 sec., cold work strain is fully relieved and thus the super-elastic properties is lost.

As mentioned above, plated nickel-titanium alloy products of this invention are excellent in fatigue resistance, surface treatability, workability, shape memory effect and retain the super-elasticity enough to use as eyeglass frames or similar ornamental articles which require a high grade and attractive appearance.

The nickel-titanium alloy products of this invention can be economically produced in the process of this invention comprising plating, intermediate heat treatment, cold working and final heat treatment. If the final heat treatment of the nickel-titanium alloy product is carried out at a temperature range of 750° to 900° C. for short periods of time, the resultant product will have a super elasticity of 4% or more and will be most suitable for producing eyeglass frame components.

Although this invention has been shown and described with respect to a preferred embodiment thereof, it should be understood by those skilled in the art that various changes and modifications in the details thereof may be made therein and thereto without departing from the spirit and scope of this invention.

What is claimed is:

1. A nickel-titanium alloy wire having a plated layer of nickel or a plated layer of a nickel alloy containing 5–15% by weight of cobalt, wherein the wire is prepared by:

electroplating a layer of nickel or a nickel alloy containing 5–15% by weight of cobalt on a nickel-titanium alloy wire, heating the plated wire at a temperature of 350°–750° for a time sufficient until a hydrogen content of the plated wire is reduced to below 10 ppm, cold working the plated wire at a working ratio of least 10%, and heating the cold worked wire at a temperature of 300°–900° C. for 10–120 seconds.

2. A nickel-titanium alloy wire according to claim 1, wherein the alloy is an alloy consisting of from 50.5 to 51.5 atomic % nickel and the remainder substantially titanium; or an alloy consisting of nickel and titanium in an atomic % ratio of from 1:0.90 to 1:1.10; and containing not more than 3% by weight of one or more elements selected from the group consisting of iron, cobalt, chromium and vanadium.

3. A nickel-titanium alloy wire according to claim 1, wherein the cold worked wire is heated at a temperature of 750°–900° C. for 10–120 seconds.

4. An eye glass frame comprising a nickel-titanium alloy according to claim 1.

* * * * *